United States Patent [19]

Kang

[11] Patent Number: 6,002,917
[45] Date of Patent: Dec. 14, 1999

[54] REFERENCE CHANNEL MAINTENANCE METHOD FOR A WIDE AREA PAGING SYSTEM

[75] Inventor: Myung-Seok Kang, Daegujkhal, Rep. of Korea

[73] Assignee: SamSung Electronics Co., Ltd., Suwon, Japan

[21] Appl. No.: 08/581,178

[22] Filed: Dec. 29, 1995

[30] Foreign Application Priority Data

Dec. 31, 1994 [KR] Rep. of Korea ................ 94-40818

[51] Int. Cl.$^6$ ............... H04Q 7/08; H04Q 7/10; H04Q 7/12
[52] U.S. Cl. ............ 455/31.3; 455/31.2; 455/38.3; 455/38.1
[58] Field of Search ................ 455/31.2, 31.3, 455/422, 421, 426, 427, 458, 38.1, 38.3, 343; 340/825.5, 825.44; 370/313, 324, 112

[56] References Cited

U.S. PATENT DOCUMENTS

| | | | |
|---|---|---|---|
| 5,047,763 | 9/1991 | Kuznicki et al. | 340/825.44 |
| 5,237,321 | 8/1993 | Oliwa | 340/825.44 |
| 5,355,126 | 10/1994 | Nelson et al. | 455/38.1 |
| 5,357,561 | 10/1994 | Grude | 455/31.2 |
| 5,396,537 | 3/1995 | Schwendeman | 340/825.44 |
| 5,485,463 | 1/1996 | Godoroja | 455/38.1 |
| 5,539,392 | 7/1996 | Hays et al. | 455/38.1 |

Primary Examiner—Wellington Chin
Assistant Examiner—Keith Ferguson
Attorney, Agent, or Firm—Robert E. Bushnell, Esq.

[57] ABSTRACT

A reference channel maintenance method for a wide area paging system connected to a public telephone network and having at least one reference frequency channel through which a paging signal can be transmitted is provided. When an incoming paging signal is not received from a public telephone network and transmitted to a desired wide area radio pager through the reference frequency channel within a predetermined time period, a dummy paging signal is generated and transmitted to the wide area radio pager through the reference frequency channel.

23 Claims, 2 Drawing Sheets

REFERENCE CHANNEL MAINTENANCE METHOD FOR A WIDE AREA PAGING SYSTEM

CROSS-REFERENCE TO RELATED APPLICATIONS

This application makes reference to, incorporates the same herein, and claims all benefits accruing under 35 U.S.C. §119 from an application for Reference Channel Maintenance Method For A Wide Area Paging System earlier filed in the Korean Industrial Property Office on Dec. 31, 1994 and there assigned Ser. No. 40818/1994.

BACKGROUND OF THE INVENTION

The present invention relates to a method for controlling a paging system, and more particularly to a method for controlling transmission in a wide area radio paging system to thereby maintain a reference channel of the wide area radio paging system.

A conventional radio pager (i.e., paging receiver) has a disadvantage in that paging service can only be provided to a single localized area, but cannot be provided nationwide. To solve this problem, a wide area paging system (PS) has been developed which can provide a wide area paging service. In other words, the conventional local area paging service has been expanded to provide service throughout the country. Accordingly, a wide area paging system configuration has been developed to accommodate the wide area paging service.

Wide area paging systems can be classified into two general types. With the first type of system, radio frequency channels (RFCH) are utilized for local paging areas, and an exclusive radio frequency channel (RFCH) is separately utilized for providing the wide area paging service. Channel transmitters are provided for transmitting paging frequencies of the radio frequency channels (RFCH). This first type of system, however, has a problem in that the exclusive radio frequency channel (RFCH) is responsible for providing paging service to all areas. Accordingly, the number of subscribers to which the wide area paging service can be provided is limited since only one exclusive radio frequency channel (RFCH) is utilized, thereby resulting in a limited frequency band.

With the second type of paging system, an exclusive radio frequency channel (RFCH) is not utilized for providing the wide area paging service. Instead, several radio frequency channels (RFCHs) utilized for various local areas are used to form a paging network over the entire country. In other words, the radio pager in this type of system is provided with radio frequency channels (RFCHs) for paging service in a local area, and is additionally provided with radio frequency channels (RFCH) for paging service in other areas outside the local area. The radio pager is provided with a plurality of reference channels (about 10 reference channels) which each represent a different local area, and is also provided with a plurality of service channels (about 10 service channels).

The reference channel is a channel for a frequency that allows the radio pager to discern a desired paging service area. That is, the reference channel refers to a radio frequency channel (RFCH) for searching for a desired paging service area. The service channel is a channel utilized as a message receiving channel by an incoming call after the desired paging service area is searched for according to the reference channel, in cases where subscribers carrying the radio pagers move around the paging service areas.

The second type of paging system described above, however, has a problem in that when a radio pager determines the desired paging service area by receiving a reference frequency of the reference channel, if an incoming paging signal of the reference channel is not generated in the desired paging service area, paging service cannot be provided to the radio pager.

For example, when the incoming paging signal is not generated through the reference channel of a given paging service area in the paging system within a given time period (e.g., incoming paging signals are not frequently generated between 4 o'clock and 7 o'clock in the morning), the paging signal cannot be transmitted to the desired radio pager through the radio frequency channel (RFCH) of the reference channel. Accordingly, there is a problem in that if the paging signal is not transmitted through the reference channel of the desired paging service area, the radio pager determining the desired paging service area by receiving the reference frequency through its reference channel automatically changes the reference channel of the desired paging service area to other reference channels of other paging service areas as a receiving channel to thereby receive other reference frequencies through the reference channels of other paging service areas. As a result, the radio pager cannot be provided with paging service in a given area in which it is actually situated. For example, if the incoming paging signal is not received within a given period of time (typically, about 10 seconds), the radio pager automatically changes the reference channel corresponding to an 'A' area to a reference channel corresponding to a "B" area, thereby making it impossible for the radio pager to be provided with paging service in the "A" area even when the radio pager is actually situated in the "A" area.

SUMMARY OF THE INVENTION

It is therefore an object of the present invention to provide a reference channel maintenance method for a wide area paging system.

It is another object to provide a wide area paging service by utilizing a plurality of reference frequencies and service frequencies in which a dummy paging signal is generated and transmitted to a radio pager when an incoming paging signal is not transmitted to the radio pager within a predetermined period of time.

It is still another object to provide a reference channel maintenance method which prevents a wide area radio pager from changing reference channels when an incoming paging signal is not transmitted to the wide area radio pager within a predetermined period of time.

To achieve these and other objects, a reference channel maintenance method for a wide area paging system connected to a public telephone network and having at least one reference frequency channel through which a paging signal can be transmitted is provided. According to the principles of the present invention, when an incoming paging signal is not received from a public telephone network and transmitted to a desired wide area radio pager through the reference frequency channel within a predetermined time period, a dummy paging signal is generated and transmitted to the wide area radio pager through the reference frequency channel to thereby maintain the reference frequency channel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
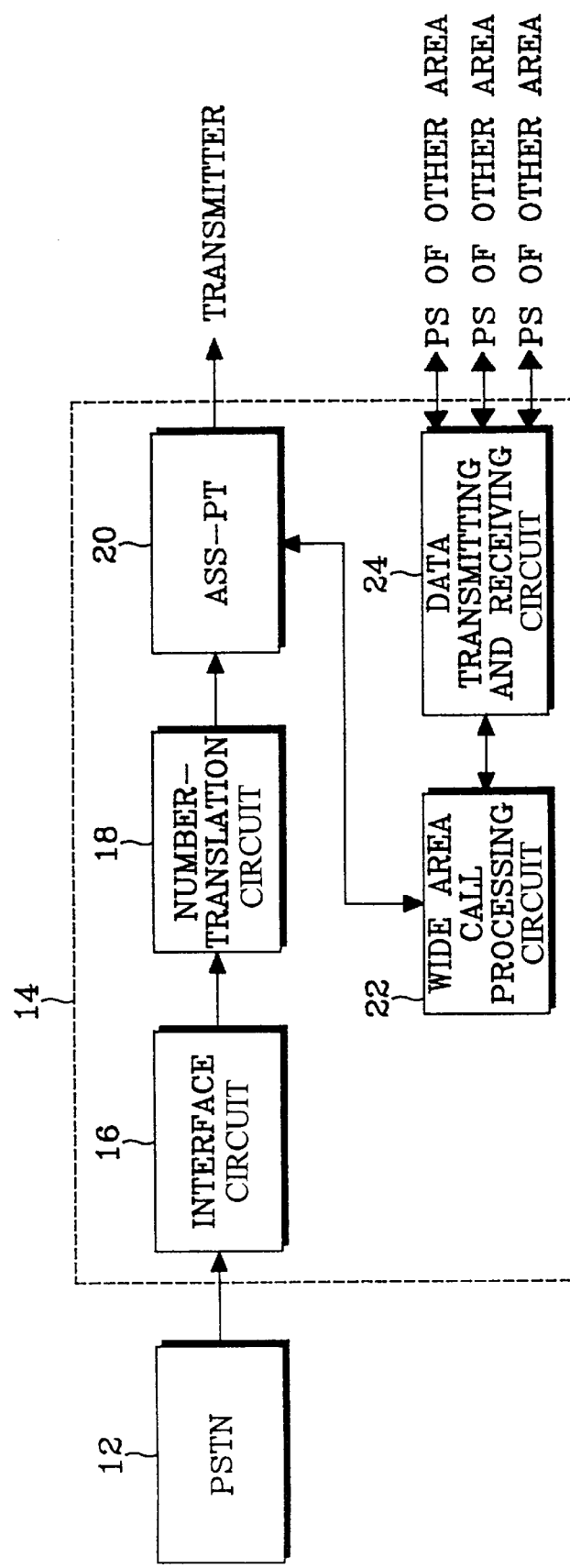
FIG. 1 is a block diagram illustrating an individual paging system included within a wide area paging system.

Turning now to the drawings and referring to FIG. 1, a block diagram of an individual paging system included within a wide area paging system is illustrated. In FIG. 1, reference number 12 represents a public switched telephone network (PSTN), and reference number 14 represents a paging system having a switching function. The type of paging utilized in the United States can be performed by the paging system shown in FIG. 1. The wide area paging system extends throughout the nation and is made up of several individual paging systems (i.e., subsystems), such as paging system 14, that are positioned at various locations. Each of these individual paging systems serves a designated local area, and is designated by a single reference channel.

Paging system 14 includes an interface circuit 16 for providing an interface for an incoming paging signal between public switched telephone network (PSTN) 12 and a number-translation circuit 18. Number-translation circuit 18 performs a number translating operation and switches the incoming paging signal provided from interface circuit 16. An access switching subsystem-paging terminal (ASS-PT) transmits the incoming paging signal to a transmitter (not shown) when the number translating operation indicates that the incoming paging signal corresponds to paging system 14. A wide area call processing circuit 22 processes signals for a wide area call. A data transmitting and receiving circuit 24 transmits data to and receives data from other paging systems corresponding to other areas.

Figure 2:
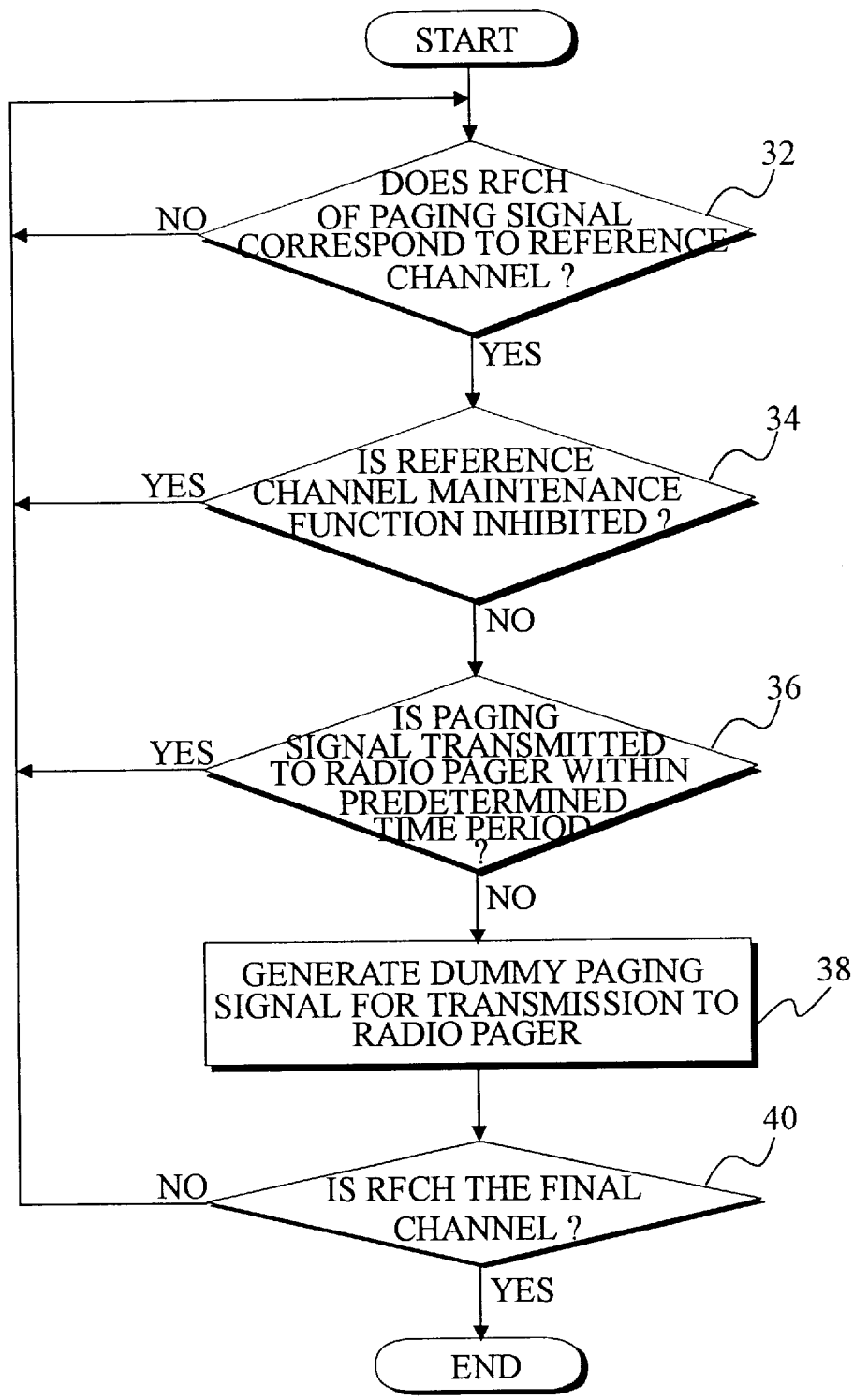
FIG. 2 is a flow chart illustrating a process of controlling a paging system to maintain a reference channel for a wide area radio pager according to the principles of the present invention.

FIG. 2 is a flow chart illustrating a process of controlling the wide area paging system to maintain a reference channel for a wide area radio pager according to the principles of the present invention. Briefly, the flow chart shown in FIG. 2 includes the steps of determining whether or not a paging signal is transmitted to a wide area radio pager through a radio frequency channel (RFCH) within a predetermined period of time, and generating and transmitting a dummy paging signal to the wide area radio pager to thereby maintain a reference channel for the wide area radio pager when it is determined that the paging signal has not been transmitted to the wide area radio pager within the predetermined period of time.

Referring to FIGS. 1 and 2, an operation of the present invention will now be described in detail.

When a general telephone subscriber from public switched telephone network 12 dials the number of a desired radio pager, incoming call information corresponding to the dialed number is transmitted to paging system 14 via public switched telephone network 12. The incoming call information is received by interface circuit 16, and transmitted to number-translation circuit 18 for performance of the number-translating operation to determine the number that was dialed.

After the number-translating operation is completed, number-translation circuit 18 transmits the incoming call information to access switching subsystem-paging terminal (ASS-PT) 20.

After access switching subsystem-paging terminal (ASS-PT) 20 receives the incoming call information from number-translation circuit 18, access switching subsystem-paging terminal (ASS-PT) 20 connects an input port to receive a dual tone multi-frequency (DTMF) signal provided from the general telephone subscriber. Access switching subsystem-paging terminal (ASS-PT) 20 also connects an output port to thereby transmit the general telephone subscriber's paging signal to the desired radio pager through a transmitter. In particular, access switching subsystem-paging terminal (ASS-PT) 20 generates a tone or voice announcement to inform the subscriber corresponding to the desired radio pager of the incoming call. When the general telephone subscriber has transmitted a message through his telephone keypad, an encoding unit within access switching subsystem-paging terminal (ASS-PT) 20 encodes the message into a paging format (e.g., POCSAG, Super POCSAG, etc.) and transfers the encoded message to the transmitter.

In the description above, when a general telephone subscriber dials the number of a desired radio pager, access switching subsystem-paging terminal (ASS-PT) 20 receives a paging signal corresponding to the number dialed by the general telephone subscriber.

After the paging signal is completely transmitted to access switching subsystem-paging terminal (ASS-PT) 20, the paging signal is transmitted to the local service area served by paging system 14 through the transmitter, and a determination is made as to whether or not the subscriber being paged is within another area of the wide area system.

When the subscriber being paged is within another area of the wide area system, the applicable paging signal and subscriber information are transmitted to wide area call processing circuit 22 from access switching subsystem-paging terminal (ASS-PT) 20. Wide area call processing circuit 22 transmits the paging signal and the subscriber information to the paging systems (PS) of other areas through data transmitting and receiving circuit 24.

Alternatively, when data transmitting and receiving circuit 24 receives a paging signal from the paging systems (PS) of other areas, the received paging signal is transmitted via wide area call processing circuit 22 and access switching subsystem-paging terminal (ASS-PT) 20 to the radio frequency channel (RFCH) of the desired radio pager. In particular, data transmitting and receiving circuit 24 receives the paging signal in an applicable signal format from paging systems (PS) of other areas, and transmits the received paging signal to wide area call processing circuit 22. Wide area processing circuit 22 processes information (i.e., Directory number, Service RFCH, CAPCODE, paging message, etc.) corresponding to the received paging signal to thereby convert the received paging signal into a signal format corresponding to paging system 14. This converted information is then transferred to access switching subsystem-paging terminal (ASS-PT) 20 for transmission to the desired radio pager. In these situations, access switching subsystem-paging terminal (ASS-PT) 20 periodically performs the control routine shown in FIG. 2, to thereby maintain the reference channel of the wide area radio pager.

Referring to FIG. 2, access switching subsystem-paging terminal (ASS-PT) 20 begins performance of the operation for maintaining the reference channel of the wide area radio pager in step 32 by determining whether or not the applicable radio frequency channel (RFCH) is registered to the reference channel of paging system 14. That is, paging system 14 essentially searches for a radio frequency channel (RFCH) that is registered to the reference channel of paging system 14 from among the plurality of radio frequency channels (RFCHs). Generally, access switching subsystem-paging terminal (ASS-PT) 20 accommodates about 80 radio frequency channels (RFCHs), and the routine shown in FIG. 2 is performed for each of the radio frequency channels (RFCHs).

When the applicable radio frequency channel (RFCH) is not registered to the reference channel of paging system 14 in step 32, access switching subsystem-paging terminal (ASS-PT) 20 returns to the beginning of the routine shown in FIG. 2. Registering a radio frequency channel (RFCH) to and deleting a radio frequency channel (RFCH) from the reference channel are executed by a man-machine communication method, which is similar to a method for maintaining and repairing an exchange. When the applicable radio frequency channel (RFCH) is registered to the reference channel of paging system 14 in step 32, access switching subsystem-paging terminal (ASS-PT) 20 then determines whether or not a reference channel maintanence function of the applicable radio frequency channel (RFCH) is inhibited in step 34.

When the reference channel maintanence function of the applicable radio frequency channel (RFCH) is inhibited in step 34, access switching subsystem-paging terminal (ASS-PT) 20 returns to the beginning of the routine shown in FIG. 2. When the reference channel maintanence function of the applicable radio frequency channel (RFCH) is not inhibited in step 34, access switching subsystem-paging terminal (ASS-PT) 20 proceeds to step 36 and checks the state of the paging signal transmitted through the applicable radio frequency channel (RFCH). That is, in step 36 access switching subsystem-paging terminal (ASS-PT) 20 determines whether or not the paging signal is generated and transmitted to the desired wide area radio pager through the applicable radio frequency channel (RFCH) within a predetermined period of time, which is typically about 10 seconds. This predetermined period of time, which begins after a "yes" determination is made in step 32, is shorter in duration than a time interval defining when the wide area radio pager switches to a different reference channel when the paging signal is not received by the wide area radio pager. When it is determined that the paging signal has been generated and transmitted to the wide area radio pager within-the predetermined period of time in step 36, access switching subsystem-paging terminal (ASS-PT) 20 returns to the beginning of the routine shown in FIG. 2. In this case, the reference channel of the wide area radio pager set forth above is maintained.

However, when it is determined that the paging signal is not generated and transmitted to the wide area radio pager within the predetermined period of time of about 10 seconds in step 36, access switching subsystem-paging terminal (ASS-PT) 20 generates and transmits a dummy paging signal to the desired wide area radio pager, in step 38, to maintain the reference channel for the wide area radio pager. Accordingly, the reference channel is not changed as previously discussed.

After step 38 is performed, access switching subsystem-paging terminal (ASS-PT) 20 determines whether or not the present radio frequency channel (RFCH) is the final channel in step 40. When the present radio frequency channel (RFCH) is not the final channel, the routine of FIG. 2 is repeatedly performed to thereby maintain the reference channel for the other radio frequency channels (RFCHs) accommodated by access switching subsystem-paging terminal (ASS-PT) 20.

Accordingly, in a paging system in which a paging signal is transmitted to a wide area radio pager that determines a service frequency of a particular local area by receiving the paging signal through the reference channel corresponding to the particular area, a dummy paging signal is automatically generated and transmitted to the wide area radio pager according to a minimum time interval to thereby solve the problem in which the reference channel of a given local area is changed even when the applicable radio pager is within that local area.

As set forth above, the method according to the present invention provides an advantage for wide area radio pagers which automatically change the reference channel of a given local area to the reference frequency of another local area when the paging call is not received through the reference channel of the given local area within a predetermined time period. Accordingly, the reference channel for the wide area radio pager is continuously maintained by generating and transmitting the dummy paging signal to the wide area radio pager to thereby allow the wide area radio pager to be provided with paging service when the paging signal is not actually generated and transmitted to the wide area radio pager even though the radio pager is situated in the given local area.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A method for maintaining a reference channel, comprising:

receiving a paging signal provided from a paging subsystem within a wide area paging system connected to a public switched telephone network;

determining whether said paging signal is transmitted via a reference frequency channel through which a paging signal can be transmitted;

making a determination of whether said paging signal is transmitted to a wide area radio pager from said public switched telephone network within a predetermined period of time; and when said determination establishes that said wide area radio pager has not been received said paging signal from said public switched telephone network within said period of time transmitting a dummy paging signal to said wide area radio pager through said reference frequency channel.

2. The method as claimed in claim 1, further comprised of said wide area radio pager switching to another reference frequency channel a given time interval after said paging signal is not received by said wide area radio pager, with said predetermined period of time being shorter than said given time interval.

3. The method as claimed in claim 1, further comprising the step of said wide area radio pager refraining from switching among different reference channels in response to receipt of said dummy paging signal.

4. The method as claimed in claim 1, further comprised of said predetermined period of time equalling ten seconds.

5. The method as claimed in claim 1, wherein said paging system comprises a plurality of paging subsystems, said method further comprising the step of determining whether a reference channel maintenance function of a first paging system is inhibited after determining that said radio frequency channel occupied by said paging signal corresponds to said reference channel of said first paging subsystem.

6. A method for maintaining a reference channel, said method comprising the steps of:

receiving an incoming signal for paging a wide area radio pager from the public switched telephone network;

transmitting a paging signal through a reference channel of a wide area paging system in response to reception of said incoming signal;

searching for a radio frequency channel that is registered to said reference channel from among a plurality of radio frequency channels;

making a determination of whether said paging signal transmitted through said reference channel has been transmitted to said wide area radio pager from said public switched telephone network within a predetermined period of time; and generating a dummy paging signal and transmitting said dummy paging signal through said reference channel to said wide area radio pager when said determination establishes that said paging signal has not been transmitted to said wide area radio pager within said predetermined period of time.

7. The method as claimed in claim 6, wherein said predetermined period of time comprises ten seconds.

8. The method as claimed in claim 6, further comprising a step of said wide area radio pager refraining from switching among different reference channels in response to receipt of said dummy paging signal.

9. The method as claimed in claim 6, wherein said paging system comprises a plurality of paging subsystems, said method further comprising the step of determining whether a reference channel maintenance function of a first paging system is inhibited after determining that said radio frequency channel occupied by said paging signal corresponds to said reference channel of said first paging subsystem.

10. A method for maintaining a reference channel in a wide area paging system having a plurality of paging subsystems, said method comprising the steps of:

receiving, at a first paging subsystem, a paging signal provided from a second paging subsystem;

determining whether a radio frequency channel occupied by said paging signal corresponds to said reference channel of said first paging subsystem;

determining whether said paging signal is transmitted to a radio pager within a predetermined period of time after determining that said radio frequency channel occupied by said paging signal corresponds to said reference channel of said first paging subsystem; and generating a dummy paging signal and transmitting said dummy paging signal to said radio pager when it is determined that said paging signal has not been transmitted to said radio pager within said predetermined period of time.

11. The method as claimed in claim 10, further comprised of said predetermined period of time equaling ten seconds.

12. The method as claimed in claim 10, wherein said predetermined period of time is shorter in duration than a time interval defining when said radio pager switches among reference channels in response to said paging signal not being received by said radio pager.

13. The method as claimed in claim 10, further comprising a step of determining whether a reference channel maintanence function of said first paging subsystem is inhibited after determining that said radio frequency channel occupied by said paging signal corresponds to said reference channel of said first paging subsystem.

14. The method as claimed in claim 13, further comprised of said predetermined period of time equaling ten seconds.

15. The method as claimed in claim 13, wherein said predetermined period of time is shorter in duration than a time interval defining when said radio pager switches among reference channels in response to said paging signal not being received by said radio pager.

16. The method as claimed in claim 10, further comprising a step of said radio pager refraining from switching among different reference channels in response to receipt of said dummy paging signal.

17. An apparatus for providing a paging service in a wide area paging system, said apparatus comprising:

first means for receiving a paging signal provided from a paging subsystem within said wide area paging system; and second means for determining whether a radio frequency channel occupied by said paging signal corresponds to a reference channel of said apparatus, determining whether said paging signal is transmitted to a radio pager within a predetermined period of time after determining that said radio frequency channel occupied by said paging signal corresponds to said reference channel of said apparatus, and generating a dummy paging signal and transmitting said dummy paging signal over said reference channel to said radio pager when it is determined that said paging signal has not been transmitted to said radio pager within said predetermined period of time.

18. The apparatus as claimed in claim 17, further comprised of said predetermined period of time equalling ten seconds.

19. The apparatus as claimed in claim 17, wherein said predetermined period of time is shorter in duration than a time interval defining when said radio pager switches among reference channels in response to said paging signal not being received by said radio pager.

20. An apparatus for providing a paging service in a wide area paging system, said apparatus comprising:

first means for receiving a paging signal provided from a paging subsystem within said wide area paging system; and second means for determining whether a radio frequency channel occupied by said paging signal corresponds to a reference channel of said apparatus, determining whether said paging signal is transmitted to a radio pager within a predetermined period of time after determining that said radio frequency channel occupied by said paging signal corresponds to said reference channel of said apparatus, and generating a dummy paging signal and transmitting said dummy paging signal to said radio pager when it is determined that said paging signal has not been transmitted to said radio pager within said predetermined period of time;

said second means determining whether a reference channel maintenance function of said apparatus is inhibited after determining that said radio frequency channel occupied by said paging signal corresponds to said reference channel of said apparatus.

21. The apparatus as claimed in claim 20, wherein said predetermined period of time equals ten seconds.

22. The apparatus as claimed in claim 20, wherein said predetermined period of time is shorter in duration than a time interval defining when said radio pager switches among reference channels in response to said paging signal not being received by said radio pager.

23. The apparatus as claimed in claim 20, wherein said radio pager refrains from switching among different reference channels in response to receipt of said dummy paging signal.

\* \* \* \* \*